United States Patent [19]

Murakami et al.

[11] Patent Number: 4,697,244
[45] Date of Patent: * Sep. 29, 1987

[54] COORDINATE INPUT DEVICE WITH DISPLAY AND PRINTER

[75] Inventors: Azuma Murakami, Tokyo; Yoshinori Taguchi; Tsuguya Yamanami, both of Ageo, all of Japan

[73] Assignee: Wacom Co., Ltd., Saitama, Japan

[*] Notice: The portion of the term of this patent subsequent to Sep. 2, 2003 has been disclaimed.

[21] Appl. No.: 693,429

[22] Filed: Jan. 22, 1985

[30] Foreign Application Priority Data

Jan. 20, 1984 [JP] Japan .................. 59-8920

[51] Int. Cl.⁴ .................. G08C 21/00; G06F 15/62
[52] U.S. Cl. .................. 364/520; 178/18; 340/706
[58] Field of Search .................. 364/520; 340/706, 707, 340/708, 712, 365 L, 365 C, 365 VL; 178/18, 19; 382/64; 338/99, 114; 324/208

[56] References Cited

U.S. PATENT DOCUMENTS

| | | | |
|---|---|---|---|
| 4,058,849 | 11/1977 | Fitzgerald et al. | 364/520 |
| 4,205,199 | 5/1980 | Mochizuki | 178/19 |
| 4,298,772 | 11/1981 | Kobayashi et al. | 178/18 |
| 4,482,784 | 11/1984 | Whetstone | 178/19 |
| 4,514,688 | 4/1985 | Whetstone | 178/18 |
| 4,568,794 | 2/1986 | Kobayashi et al. | 178/18 |
| 4,609,776 | 9/1986 | Murakami et al. | 178/18 |

FOREIGN PATENT DOCUMENTS

| | | | |
|---|---|---|---|
| 54-24539 | 2/1979 | Japan | 340/707 |
| 57-157339 | 9/1982 | Japan | 340/707 |
| 58-144287 | 8/1983 | Japan | . |

Primary Examiner—Felix D. Gruber
Attorney, Agent, or Firm—Pollock, Vande Sande & Priddy

[57] ABSTRACT

A coordinate input device with display includes a tablet having a plurality of parallel X-direction magnetostrictive transmission mediums, a plurality of parallel Y-direction magnetostrictive transmission mediums superposed on, and substantially orthogonal to the X-direction mediums thereto, and first and second coils wound around the magnetostrictive transmission mediums. The device further includes a plurality of biasing magnetic means for applying a biasing magnetic field to portions of the magnetostrictive transmission mediums surrounded by the first and second coils, and a tabular display superposed on the tablet and having a display area substantially equal to the position detection area on the tablet. A magnetic pen is used to cause a local increase of electro-mechanical coupling coefficient in the magnetostrictive transmission mediums in the tablet. The device further has an apparatus for recording in hard copy form the data corresponding to the appointed coordinate values, made by the magnetic pin on the display and can be visually checked.

6 Claims, 8 Drawing Figures

COORDINATE INPUT DEVICE WITH DISPLAY AND PRINTER

BACKGROUND OF THE INVENTION

1. Field of the Invention

The present invention relates to a coordinate input device with display, which allows an easy input and display of data such as hand-written characters and patterns, as well as production of a hard copy of the displayed data.

2. Description of the Prior Art

An apparatus for inputting and outputting data such as hand-written characters and patterns through a tablet which is constructed separately from a display on which the result of recognition of the inputted data is displayed. In the use of this type of apparatus, the user is obliged to alternately watch both the tablet surface and the display screen, in order to confirm that the characters and patterns hand-written on the tablet have been recognized and inputted correctly. Consequently, the efficiency of the inputting operation by hand-writing is impaired considerably. In this type of apparatus, the position of the character to be corrected or deleted during editing is appointed by means of a cursor. Therefore, the user has to operate keys to move the cursor on display while carefully watching both the instant position of the cursor on display and the aimed character in the original text. This seriously impairs the efficiency of the operation.

In order to obviate this problem, Japanese Patent Laid-Open No. 144287/1983 discloses an inputting/outputting apparatus in which the tablet and the display are integrated with each other. With this apparatus, the designated position in the document on display can be directly appointed on the tablet by means of a stylus pen which is connected to a character recognition circuit, so that the edition and inputting/outputting operation are facilitated considerably. Namely, the user can input the data simply by "writing" the sentence on the tablet in a manner as if he is writing the sentence directly on an output paper sheet.

This apparatus, however, still suffers from the following disadvantage. Namely, the "writing" operation for inputting the characters on the writing area of the tablet is seriously impeded by the presence of the cord through which the stylus pen is connected to the character recognition circuit. In addition, precision of position appointment is failed unless the stylus pen is held in contact with or in the close proximity of the tablet.

The display can hold the image of the inputted data only temporarily. It is, therefore, desirable that the data can be recorded by, for example, plotting or printing on a recording paper sheet.

SUMMARY OF THE INVENTION

Object of the Invention

Accordingly, a first object of the invention is to provide a coordinate input device with display, which permits an easy and highly precise appointment of position on the tablet from a remote place above the tablet, i.e., from a position above the display superposed on the tablet, by means of a position appointing magnetism generator, while providing a visual display of the appointed position directly on the display and producing, as required, a hard copy of the position data including characters an patterns formed by the consecutive appointment of positions.

A second object of the invention is to provide a coordinate input device with display, wherein the data is inputted by means of a magnetism generator which is not connected to any stationary part of the system through a cord, so that the inputting operation and the observation of the displayed data can be made without the hinderance of a cord.

A third object of the invention is to provide a coordinate input device with display which can adopt any type of thickness of display, provided that a magnetic field produced by a position appointing magnetism generator can reach as far as the magnetostrictive transmission medium through the display which is placed therebetween.

To these ends, according to the invention, there is provided a coordinate input device with display comprising: a tablet having a plurality of X-direction magnetostrictive transmission mediums arranged in parallel, a plurality of Y-direction magnetostrictive transmission mediums arranged in parallel and superposed to the X-direction transmission mediums substantially orthogonally thereto, and first and second coils wound around the magnetostrictive transmission mediums; a tabular display superposed on the tablet and having a display area substantially equal to the position detection area on the tablet; a position appointing magnetism generator capable of producing a magnetism just enough for causing a local increase of electro-mechanical coupling coefficient in the magnetostrictive transmission mediums in the tablet; a position detecting circuit adapted to supply a pulse current to one of the first and second coils so as to generate magnetostrictive vibration wave in a reference position on each magnetostrictive transmission medium or a position appointed by the position appointing magnetism generator, the position detecting circuit being further adapted to measure the time duration between the moment at which the magnetostrictive vibration wave is generated and a moment at which the magnetostrictive vibration wave has reached the appointed position or the reference position, thereby detecting the coordinate values of the position appointed by the position appointing magnetism generator; a display control circuit adapted for driving the display in such a manner that the position corresponding to the coordinate values is displayed on the display; and a hard copy producing means for producing a hard copy of the data corresponding to the appointed coordinate values.

In this coordinate input device, it is possible to appoint a position on the tablet highly precisely through a simple operation by means of the position appointing magnetism generator from a position remote from the tablet, i.e., from a position above the display which is superposed to the tablet. In addition, the position data thus inputted is displayed on the display on the tablet for an easy visual check. Furthermore, a hard copy of the position data can be obtained as required.

These and other objects, features and advantages of the invention will become clear from the following description of the preferred embodiment when the same is read in conjunction with the accompanying drawings.

DESCRIPTION OF THE PREFERRED EMBODIMENT

Figure 1:
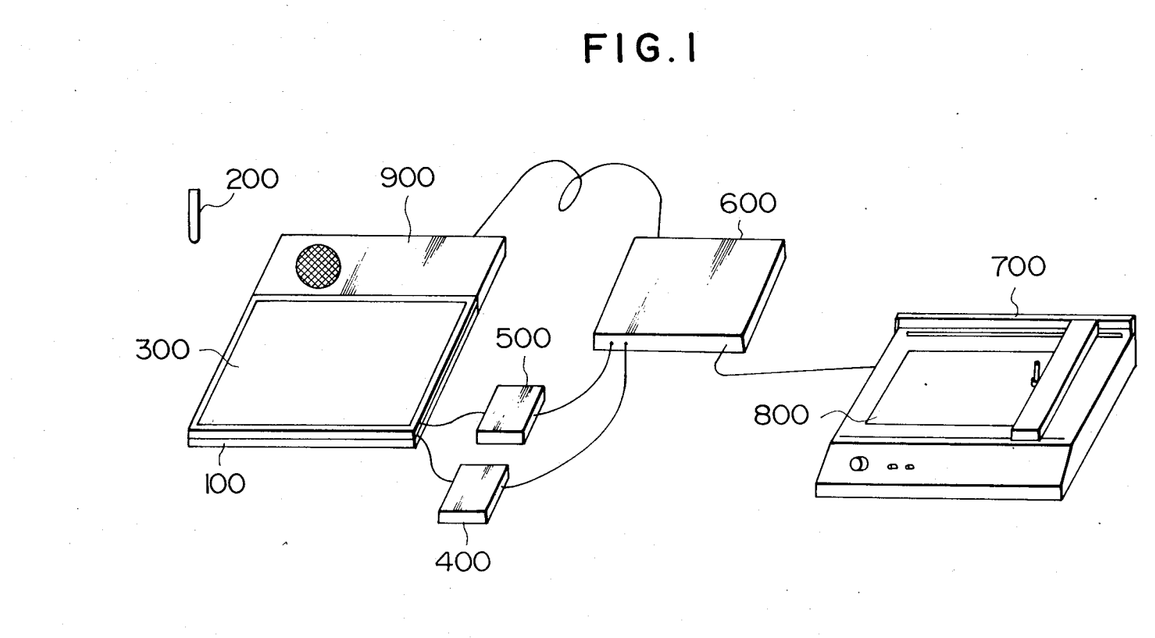
FIG. 1 is a schematic perspective view of an embodiment of the coordinate input device with display in accordance with the invention.

FIG. 1 is a schematic perspective view of an embodiment of the coordinate input device with display in accordance with the invention. This embodiment has position appointing magnetism generator 200 (referred to simply as "magnetic pen", hereinafter) for appointing a coordinate position on a tablet 100. The system further has a planar display 300 superposed on the tablet 100, and various circuits and means such as a position detecting circuit 400 for detecting the coordinate position on the tablet 100 appointed by the magnetic pen 200, a display control circuit 500 for driving the display 300, a processing circuit 600, and a hard copy producing means 700 such as a plotter which is known per se. Numerals 800 and 900 denote, respectively, a recording paper sheet and a voice composing device.

Figure 2:
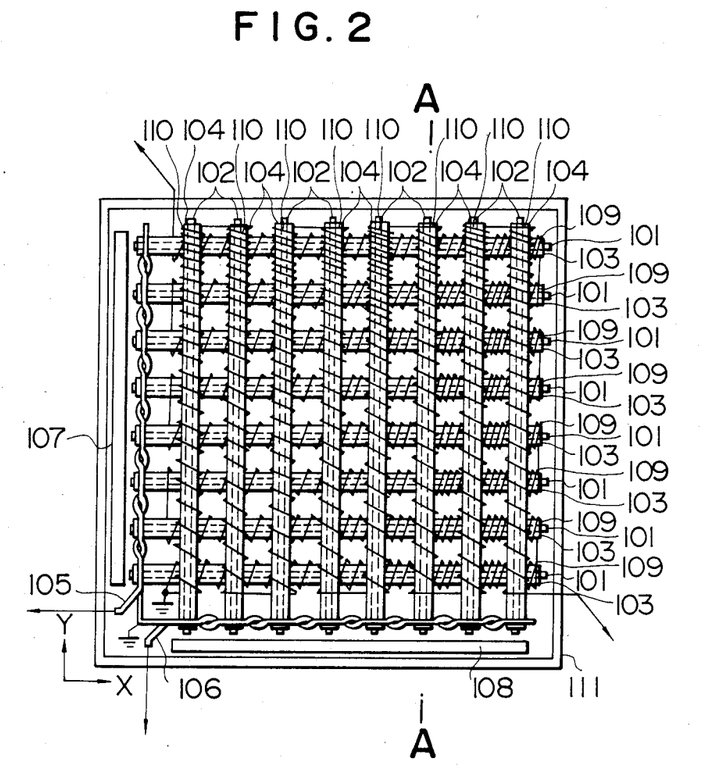
FIG. 2 is a plan view of a tablet constituting a part of a the coordinate input device.
Figure 3:
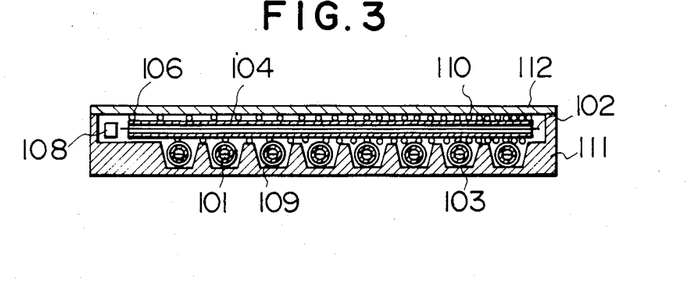
FIG. 3 is a sectional view taken along the line A—A' in FIG. 2.

FIG. 2 is a plan view of a tablet 100, while FIG. 3 is a sectional view taken along the line A—A' in FIG. 2. From these Figures, it will be seen that the tablet 100 is constituted by a plurality of X-direction magnetostrictive transmission mediums 101 arranged in parallel and a plurality of Y-direction magnetostrictive transmission mediums 102 arranged in parallel and substantially orthogonal to the X-direction magnetostrictive transmission mediums. The magnetostrictive transmission mediums 101,102 can be produced from any ferromagnetic material. In order to produce a strong magnetostrictive vibration wave, however, it is advisable to use a material having a large magnetostrictive effect, such as an amorphous alloy rich in iron. It is also preferred that the material of the magnetostrictive transmission medium has a small coercive force so that they may not be easily magnetized when approached by the magnet. Typical examples of such amorphous alloys are $Fe_{67}CO_{18}B_{14}Si_1$ (atom %) and $Fe_{81}B_{13.5}Si_{3.5}C_2$ (atom %).

Each of the magnetostrictive transmission mediums 101 and 102 has an elongated linear form with a rectangular or a circular cross-section. When the medium has a rectangular cross-section, the width is preferably on the order of several millimeters (mm), while the thickness is preferably selected to range between several micron meters ($\mu$m) and several tens of micron meters ($\mu$m). As is well known to those skilled in the art, the amorphous alloy can be produced easily in the form of a thin ribbon having a thickness of 20 to 50 micron meters ($\mu$m), so that the magnetostrictive transmission mediums can be formed without substantial difficulty by simply splitting the ribbon into thin strips or lines. In the described embodiment, the magnetostrictive transmission medium is produced from an amorphous alloy $Fe_{81}B_{13.5}Si_{3.5}C_2$ (atom %) in the form of a thin strip of 2 mm wide and 0.02 mm thick.

Each of the X-direction magnetostrictive transmission mediums 101 is housed in an elongated cylindrical sheath 103 made of, for example, a synthetic resin. Each of the Y-direction magnetostrictive transmission mediums is received by a similar sheath 102.

An X-direction first electromagnetic converter 105, which is in this case a continuous coil (referred to as "X-direction first coil", hereinunder) is wound round one of the axial ends of the sheaths 103 which encase the transmission mediums 101. The X-direction first coil 105 is twisted in the portions thereof which are between respective adjacent sheaths 103, such that the portions of this coil on two adjacent mediums 101 are wound in opposite directions. Therefore, when an electric current is supplied to the coil 105, the magnetic fluxes formed by these portions of the coil 105 have opposite polarities. For the same reason, when a magnetic flux is applied to the coil 105, voltages of the opposite polarities are generated in these portions of the coil 105. Therefore, any noise produced by these coil portions when a pulse current is supplied to the coil 105, as well as any voltages induced in these coil portions by any external factor, are negated by each other to minimize the influence of such noises and voltages. Although in the illustrated embodiment the coil 105 has one turn around each sheath 103, this is only illustrative and the number of turns may be two or more. In the described embodiment, the function of this X-direction first coil is to generate a momentary change in the magnetic field thereby producing magnetostrictive vibration waves in the portions of the magnetostrictive transmission mediums 101 surrounded by the coil 105. The coil 105 is connected at its one end to a pulse current generator incorporated in a position detecting circuit 400, which will be described later, while the other end of the coil 105 is grounded.

A Y-direction first electro-magnetic converter 106 which is in this case a coil (referred to as "Y-direction first coil", hereinafter) is arranged on one of the ends of the sheaths 104 encasing the magnetostrictive transmission mediums 102. The Y-direction first coil 106 is twisted at the portions thereof which are between respective adjacent sheaths 104 such that the portions of this coil 106 on two adjacent magnetostrictive transmission mediums 102 have opposite winding directions. As in the case of the X-direction first coil 105, the Y-direction first coil 106 has one end connected to a pulse current generator and the other end grounded. The function of this coil 106 is the same as that of the coil 105.

Figure 4:
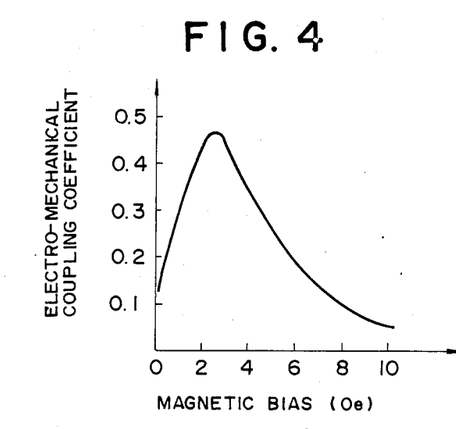
FIG. 4 is a chart showing how an electro-mechanical coupling coefficient is changed in relation to the level of a magnetic bias.

Magnetism generators 107,108 such as angular magnets, used as means for appointing reference positions, are disposed, respectively, along the ends of the magnetostrictive transmission mediums 101 surrounded by the X-direction first coil 105 and the ends of the magnetostrictive transmission mediums surrounded by the Y-direction first coil 106, so as to apply biasing magnetic fields parallel to these magnets. By applying such biasing magnetic fields, it is possible to generate a strong magnetostrictive vibration wave with a small electric current, and to identify the position where the magnetostrictive vibration wave has been produced. More specifically, referring to FIG. 4, the electro-mechanical coupling coefficient, representing the efficiency of conversion from mechanical energy to electric energy and vice versa, of the magnetostrictive transmission mediums 101,102 is maximized when these mediums are under the influence of a certain intensity of biasing magnetic field. By applying biasing magnetic field of such intensity to the portions of the transmission mediums surrounded by respective first coils 105 and 106, it is possible to generate magnetostrictive vibration wave at a high efficiency.

A reference numeral 109 designates an X-direction second electromagnetic converter such as a coil wound around the sheath 103 over a substantial length of each magnetostrictive transmission medium 101. The coils 109 on all magnetostrictive transmission mediums 101 have the same winding direction which is in this case counter-clockwise, and are connected in series such that two adjacent coils have reverse polarities. Therefore, when a magnetic field of a certain polarity is applied to all coils 109, voltages of reverse polarities are produced in adjacent coils 109. For the same reason, when an electric current is supplied to the series connection of the coils 109, magnetic fields of opposite polarities are formed by adjacent coils 109. With this arrangement, therefore, any voltages or noises caused by external factors are negated and weakened.

The pitch of winding of the coil 109 is progressively increased along the length of the magnetostrictive transmission medium 101 from the end closer to the X-direction first coil 105 towards the other end, thus compensating for any reduction in the induced voltage attributable to an attenuation of the magnetostrictive vibration wave. In general, the pitch of this coil 109 is preferably small, in order to allow a large electromotive force to be induced in this coil. The X-direction second coil 109 is intended for detecting any voltage induced by the magnetostrictive vibration wave propagating through the magnetostrictive transmission medium 101. The series connection of the X-direction second coils 109 is connected at its one end to a pulse detector in the position detecting circuit 400 and is grounded at its other end. Thus, the region in which the coil 109 is wound constitutes the position detecting region.

A Y-direction second electro-magnetic converter 110, e.g., a coil, is wound around on each sheath 104 over the substantial length of the magnetostrictive transmission medium 102. The coils 110 on all magnetostrictive transmission mediums 102 have the same winding direction which is in this case counter-clockwise, and are connected in series such that the coils 110 on two adjacent magnetostrictive transmission mediums have reverse polarities. The pitch of the coil 110 is progressively increased along the length of the magnetostrictive transmission medium 102 from the end thereof adjacent to the Y-direction first coil 104 towards the other end. The series connection of the Y-direction second coils 110 is connected at its one end to the pulse detector of the position detecting circuit 400 and is grounded at its other end. The function of this coil is the same as that of the coil 109.

The X-direction magnetostrictive transmission mediums 101, sheaths 103, X-direction first coil 105 and the X-direction second coils 109 in combination constitute an X-direction position sensing unit. This unit is placed in a recess formed in the bottom of a non-magnetic metallic case 111. On the other hand, a Y-direction position sensing unit, constituted by the magnetostrictive transmission mediums 102, sheaths 104, Y-direction first coil 106 and the Y-direction second coils 110, is superposed on the X-direction position sensing unit substantially orthogonally thereto, and is fixed by a suitable bond as desired. The reference position appointing magnets 105 and 106 are fixed to the bottom of the metallic case 111 so as to face the ends of the magnetostrictive transmission mediums 101 and 102, at the upper, lower or lateral side of these mediums. A lid 112 made of a non-magnetic metal fits on the metallic case 111.

Figure 5:
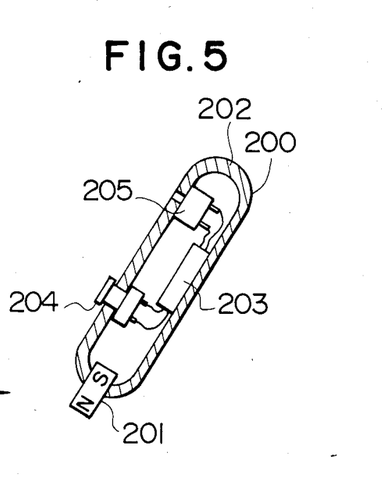
FIG. 5 is a sectional view of a position appointing magnetism generator.
Figure 6:
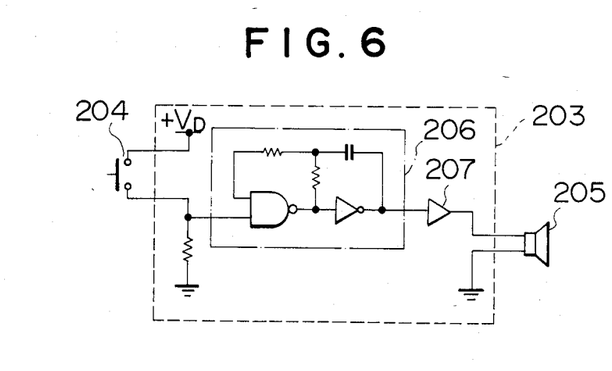
FIG. 6 is an electric circuit diagram showing the electric circuit of the position appointing magnetism generator.

FIG. 5 is a sectional view of a position appointing magnetism generator, i.e., the magnetic pen 200, while FIG. 6 is a circuit diagram showing the electric circuit thereof. The magnetic pen 200 has a cylindrical bar magnet 201 which is encased by a pen-shaped case 202 with its N-pole directed downwardly. A numeral 203 designates a signal generator adapted for generating a predetermined signal representative of the commencement of the measurement. When an operation switch 204 is turned on, an oscillation circuit 206 constituted by an AND circuit, inverter, resistor and a capacitor starts to oscillate so as to produce a continuous pulse signal of a predetermined frequency representing the commencement of the measurement. The pulse signal is amplified by the amplifier 207 and is converted into a supersonic wave signal which is transmitted from a supersonic wave transmitter 205 to a receiver in the position detecting circuit 400.

A known matrix type liquid crystal display panel having a plurality of horizontal electrodes and a plurality of vertical electrodes which are arranged in a crossing manner with liquid crystal medium interposed therebetween is used as the display 300. The display 300 has a display area which is substantially equal to the input-receiving area on the tablet 100, and is superposed on the tablet 100 in such a way that the coordinate position on the tablet geometrically coincides with the coordinate position on the display 300.

Figure 7:
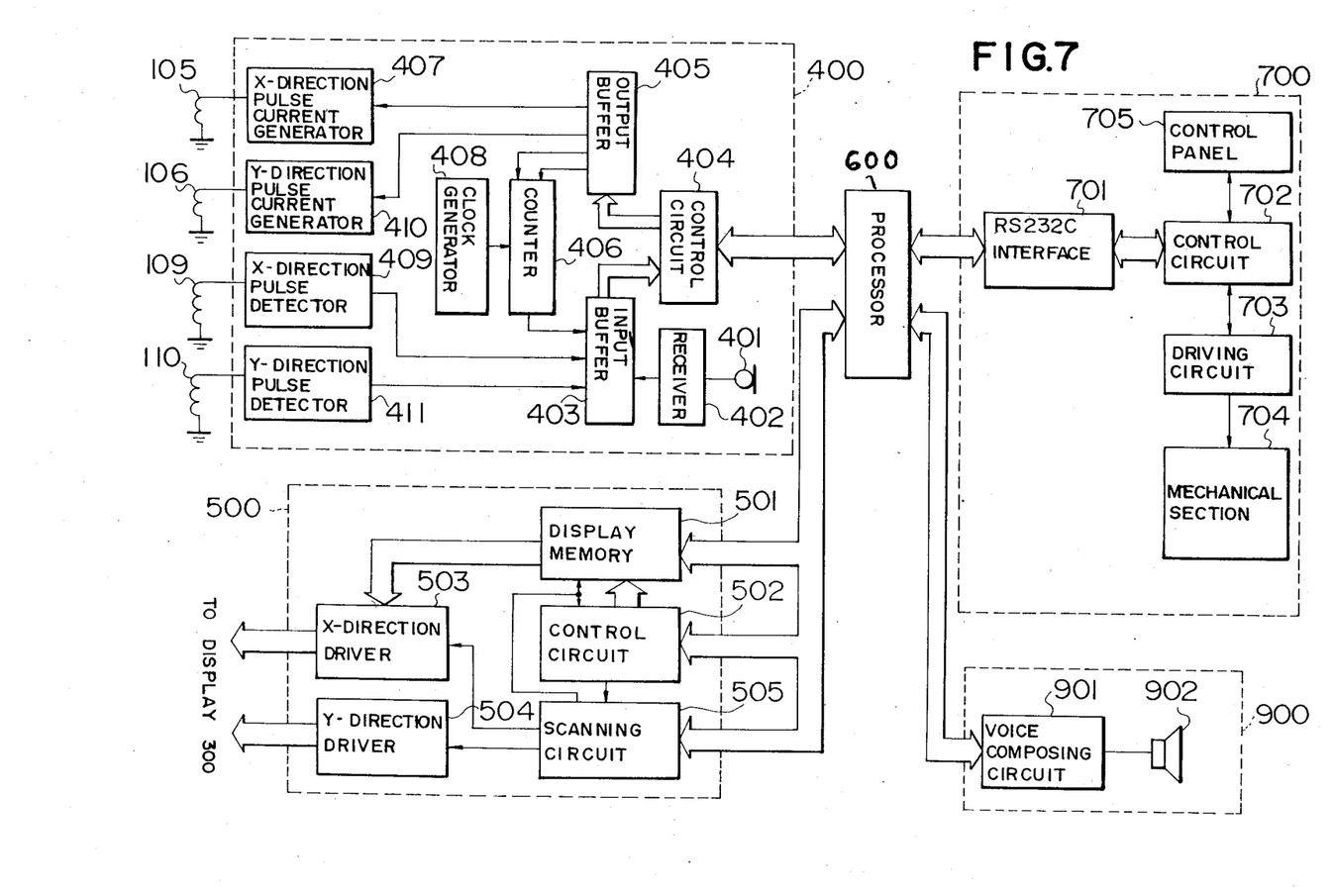
FIG. 7 is a block diagram of the whole system.

The operation of the coordinate input system with display in accordance with the invention will be described hereinafter with reference to FIG. 6 showing the electric circuit of the magnetic pen 200 and FIG. 7 which is a block diagram of the whole system.

It is assumed here that the magnetic pen 200 is positioned above the magnetostrictive transmission medium 101 which is spaced by a distance $l_1$ in the X-axis direction from the center of the X-direction first coil and above the magnetostrictive transmission medium 102 which is spaced by a distance $l_2$ in the Y-direction from the center of the Y-direction first coil 106, and is applying to these magnetostrictive transmission mediums a magnetic flux of an intensity just sufficient to cause an appreciable increase in the electro-mechanical coupling coefficient, across the thickness of the display 300.

In this state, when the operation switch 204 of the magnetic pen 200 is turned on, a supersonic wave signal indicative of the commencement of the measurement is transmitted from the wave transmitter 205. This supersonic wave signal is received by the wave receiver 401 and is converted into an electric signal. This electric signal is then amplified and shaped by the receiver 204 and is delivered to an input buffer 403. A control circuit 404 reads out from the input buffer 403 the signal indicative of the commencement of the measurement, thus acknowledging the commencement of the measurement. The control circuit 404 then resets the counter 406 through the output buffer 405 and activates the X-direction pulse current generator 407. The counter 406 then starts to count the clock pulses generated by the clock generator 408. The frequency of the clock pulses is, for instance, 100 MHz.

Then, the X-direction pulse current generator 407 starts to operate and supply a pulse current to the X-direction first coil 105, so that the X-direction first coil 105 causes a momentary change in the magnetic flux, thus generating magnetostrictive vibration waves in the portions of the magnetostrictive transmission mediums 101 surrounded by this coil 105. The thus generated magnetostrictive vibration wave propagates through the magnetostrictive transmission mediums 101 in the longitudinal direction at a velocity (about 5000 m/sec in the illustrated case) peculiar to the magnetostrictive transmission medium. During the propagation of the magnetostrictive vibration wave, conversion from mechanical energy into magnetic energy is conducted every moment at the instant position of the magnetostrictive vibration wave. The conversion is made at an efficiency which is determined by the electro-mechanical coupling coefficient of the portion of the magnetostrictive transmission medium where the magnetostrictive vibration wave exists. As a result of the conversion, an electromotive force is induced in the X-direction second coil 109.

Figure 8:
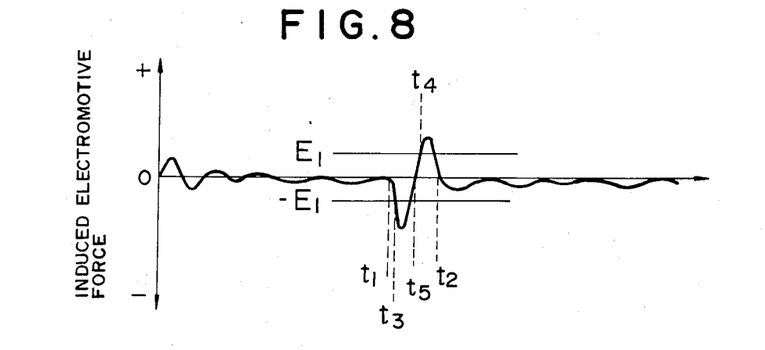
FIG. 8 is a diagram showing, by way of example, a change in the electromotive force induced in an X-direction second coil incorporated in the tablet.

FIG. 8 shows how the electromotive force induced in the X-direction second coil 109 is changed in relation to time. The moment at which the pulse current is applied to the X-direction first coil 105 is represented as $t=0$. As will be seen from FIG. 8, the amplitude of the induced electromotive force has a first peak which appears immediately after the moment $t=0$ and second peaks appearing during a period between moments $t_1$ and $t_2$. The peak value of the electromotive force appearing immediately after the moment $t=0$ is attributable to the mutual electromagnetic induction between the X-direction first coil 105 and the X-direction second coil 109, while the peaks appearing in the period between the moments $t_1$ and $t_2$ are attributable to the fact that the magnetostrictive vibration wave, which was generated in the portion of the magnetostrictive transmission medium 101 surrounded by the X-direction first coil 105 and propagated through the magnetostrictive transmission medium 101, has reached a position immediately below the magnetic pen 200 where the electro-mechanical coupling coefficient is increased by the magnetic field produced by the magnetic pen 200. Therefore, when the magnetic pen 200 is moved along the length of the magnetostrictive transmission medium 101, i.e., in the X-direction, the position of the peak of the voltage induced by the magnetostrictive vibration wave moves along the time axis. Therefore, by measuring the propagation time between the moment $t_0$ and the period $t_1-t_2$, it is possible to know the distance $l_1$, i.e., the position appointed by the magnetic pen 200 in the X-direction. Referring to FIG. 8, the moment $t_3$ at which the induced voltage has come down below a predetermined threshold $-E_1$ or a moment $t_4$ at which another threshold $E_1$ is exceeded by the induced voltage can be used as the basis for the measurement of the propagation time. Even a zero-cross point $t_5$ may be used as such a basis.

The electromotive force generated in the X-direction second coil 109 is delivered to an X-direction pulse detector 409. The X-direction pulse detector 409 includes an amplifier, comparator and other elements, and produces an output of high level throughout the period in which the electromotive force is greater than the threshold value $E_1$, i.e., when the positive polarity portion of the voltage induced by the magnetostrictive vibration wave is being detected. The control circuit 404 delivers, upon reading this high-level signal through the input buffer 403, a counting stop signal to the counter 406 through the output buffer 405, thereby stopping the counting operation. A digital value corresponding to the time duration between the moment at which the pulse current is supplied to the X-direction first coil 105 and the moment at which a voltage induced by the magnetostrictive vibration wave appears in the X-direction second coil 109 is therefore obtained in the counter 406. Since the magnetostrictive vibration wave propagates at a constant velocity of 5000 m/sec, this digital value corresponds to the distance $l_1$ in the X-direction between the X-direction first coil 105 and the position appointed by the magnetic pen 200. The X-direction position data thus obtained in the form of a digital value in the counter 406 is read by the control circuit 404 through the input buffer 403 and is temporarily stored in the processing circuit 600.

Then, the control circuit 404 resets the counter 406 again and operates the Y-direction pulse current generator 410. The control circuit 404 watches the output of the Y-direction pulse detector 411 and obtains the Y-direction position data concerning the position appointed by the magnetic pen 200. The thus obtained data is delivered to the processing circuit 600.

The operation described hereinabove is repeated so that the X- and Y-direction position data concerning the points successively appointed by the magnetic pen 200 are obtained and stored in the processing circuit 600.

The position data stored in the processing circuit 600 and constituted by the X- and Y-direction data is delivered to the display memory 501 and is stored in the memory in a predetermined order or sequence. The position data thus stored in a predetermined order is successively read out from the display memory 501 in accordance with timing pulses which are delivered by the control circuit 502. The X-direction position data read out from the display memory is delivered to an X-direction driver 503, while the Y-direction position data read out from the display memory 501 is delivered to a Y-direction driver 504. The X-direction driver 503 and the Y-direction driver 504 receive scanning pulses which are produced by a scanning circuit 505 in synchronization with the timing pulses produced by the control circuit 502. In response to these scanning pulses, the drivers 503 and 504 drive the electrodes on the display 300 corresponding to the X- and Y-direction position data, so that the position on the tablet 100 appointed by the magnetic pen 200 is displayed at the identical position on the display 300. Thus, the characters and patterns scribed by the magnetic pen 200 across the thickness of the display 300 are displayed by luminescence on the display 300 itself, as if these characters and patterns has been directly "written" with the magnetic pen 200 on the display 300.

On the other hand, the position data stored in the processing circuit 600, i.e., the coordinate values, of a multiplicity of dots constituting the hand-written characters and patterns, are outputted to the plotter 700 as required, whenever a hard copy outputting instruction is given to the processing circuit 600. The plotter 700 has a control circuit 702 which receives the position data through an RS 232 C interface 701. The control circuit 702 controls a driving circuit thereby operating the mechanical section 704. The mechanical section includes a recording pen, an arm capable of moving the pen in X- and Y-directions, a motor for driving the arm, and other members. In operation, the recording pen is moved to a position on a recording paper sheet 800 corresponding to the coordinate values of the first dot of the position data. Then, the recording pen is lowered into contact with the recording paper 800, and is moved to trace the consecutive coordinate values of the dots, thus plotting and scribing the characters or patterns on the recording paper sheet 800. After the completion of plotting of a series of data, the recording pen is once moved apart from the recording paper sheet 800 and the above-described operation is repeated for inputting the next continuous data. Consequently, the characters and patterns well conforming with those "written" by the magnetic pen 200 are scribed on the recording paper sheet 800.

In the described embodiment, the coordinate positions appointed on the tablet 100, i.e., the data such as characters and patterns, are delivered to a voice composing device 900 through the processing circuit 600. The voice composing device 900 has a voice composing circuit 901 incorporating a memory. Using this memory, the voice composing circuit 901 produces acoustic signals corresponding to the delivered data, thus composing and generating "voice" which is transmitted through a speaker 902. It is thus possible to acoustically confirm the inputted data and, hence, to find any error.

The position data can be temporarily stored in the processing circuit 600 so that a plurality of hard copies are obtainable by using a plurality of recording paper sheets. It is also possible to store the position data in an external memory device (not shown), so that the data can be outputted and hard copy can be produced whenever such hard copy is required. The magnetic pen 200 is required only to apply a small biasing magnetic field to the magnetostrictive transmission mediums 101,102 in the tablet 100. Therefore, the magnetic pen 200 need not be used in the vicinity of the unit consisting of the tablet 100 and the display 300. For instance, a hard copy of characters and patterns on a document sheet is obtainable by placing the document sheets on the display 300 and tracing the lines of characters and patterns on the document sheet by means of the magnetic pen 200.

Edition of the data, such as correction, insertion and deletion of characters can be made freely if the processing circuit 600 is provided with a suitable editing function. If the device of the invention is equipped with color pattern processing function in combination with the display 500 and the plotter 700 having color display and plotting functions, the device of the invention will be applied also to the cases where the recognition of color is essential, e.g., to the fields of decorative design, fashion design and so forth. In such uses, colored hard copies can be produced easily to facilitate the designing work.

Although in the described embodiment a plotter is used as a hard copy producing means, this is only illustrative and other suitable means such as a printer can be used as the hard copy producing means.

In the described embodiment, the magnetostrictive vibration waves are produced by the X-direction first coil 105 and the Y-direction first coil 106, while the X-direction second coil 109 and the Y-direction second coil 110 are used as the detecting coils for detecting the magnetostrictive vibration waves. This arrangement, however, is only illustrative and the arrangement may be such that the X- and Y-direction second coils are used for the generation of the magnetostrictive vibration waves, while the X- and Y-first coils are used as the detecting coils. Namely, in this case, the magnetostrictive vibration waves are generated in the portions of the magnetostrictive transmission mediums immediately below the magnetic pen 200, and the electromotive forces are induced in respective second coils 109 and 110.

It is to be understood that the term "electromagnetic converter" referred to in this specification generally includes elements and devices capable of conducting a conversion from a change in the magnetic field (magnetic flux) into a change in voltage and current and vice versa. Although the described embodiment employs coils as the electromagnetic converters by way of example, the invention does not exclude the use of other types of electromagnetic converter. For instance, the X-direction first coil and the Y-direction first coil may be substituted by magnetic heads. The use of such magnetic heads minimizes the external leak of the magnetic flux and ensures a higher precision of detection of the coordinate position.

As will be understood from the foregoing description, the invention offers various advantages as summarized below.

The coordinate input device with display in accordance with the invention permits a highly precise inputting of the coordinate position data into a tablet by means of a position appointing magnetism generator from a remote place on or above the display across the thickness of the display superposed on the tablet, as well as a visual check of the inputted data by means of the display on the tablet. Furthermore, a hard copy of the inputted data is obtained as desired.

In addition, since the display is superposed on the tablet, it is possible to eliminate troubles such as doubling of character and pattern lines due to angular parallax.

Furthermore, the position appointing magnetism generator need not be connected to the stationary part of the system through a cord, because it is not necessary to pick up the timing at which the intensity of magnetic field is changed or the timing at which the magnetic field intensity is changed. Consequently, the maneuverability is improved remarkably thus facilitating the inputting of the coordinate position data.

In addition, since the position appointing magnetism generator is required only to apply a small biasing magnetic field to the tablet, it is not necessary to use the position appointing magnetism generator in the close proximity to the tablet. Therefore, characters and patterns already written on a document sheet can be inputted and hard copies of such data can be produced easily, by placing the document sheet on the display and tracing the lines of characters and patterns by the magnetic pen.

Although the invention has been described through specific terms, it is to be noted here that the described embodiment is only illustrative and various changes and modifications may be imparted thereto without departing from the scope of the invention which is limited solely by the appended claims.

What is claimed is:
1. A coordinate input device with display comprising:
   a tablet having a plurality of X-direction magnetostrictive transmission mediums arranged in parallel, a plurality of Y-direction magnetostrictive transmission mediums arranged in parallel and superposed on said X-direction transmission mediums substantially orthogonal thereto, and first and second electromagnetic converters wound around said X and Y-direction magnetostrictive transmission mediums;

a tubular display superposed on said tablet and having a display area substantially equal to the position detection area on said tablet;

a position appointing magnetism of generator capable of producing a magnetism just enough for causing a local increase of electro-mechanical coupling coefficient in said magnetostrictive transmission mediums in said tablet;

a position detecting circuit adapted to supply a pulse current to one of said first and second electromagnetic converters so as to generate magnetostrictive vibration wave in a reference position on each magnetostrictive transmission medium or a position appointed by said position appointing magnetism generator, said position detecting circuit being further adapted to measure the time duration between the moment at which said magnetostrictive vibration wave is generated and a moment at which said magnetostrictive vibration wave has reached the appointed position or said reference position, thereby detecting the coordinate values of the position appointed by said position appointing magnetism generator;

a display control circuit adapted for driving said display in such a manner that the position corresponding to said coordinate values is displayed on said display; and a hard copy producing means for recording the data corresponding to said coordinate values.

2. A coordinate input device with display as set forth in claim 1, wherein said magnetostrictive transmission mediums are made of an amorphous alloy.

3. A coordinate input device with display as set forth in claim 1, wherein said first and second electromagnetic converters comprises coils.

4. A coordinate input device as set forth in claim 1, wherein said display comprises a matrix-type liquid crystal display device having a plurality of horizontal electrodes and a plurality of vertical electrodes which are arranged to cross each other with a liquid crystal medium interposed therebetween.

5. A coordinate input device as set forth in claim 1, wherein said hard copy producing means includes a plotter.

6. A coordinate input device with display comprising:

a tablet having a plurality of X-direction magnetostrictive transmission medium arranged in parallel, a plurality of Y-direction magnetostrictive transmission mediums arranges in parallel and superposed on said X-direction transmission mediums substantially orthogonal thereto, and first and second coils would around said magnetostrictive transmission-mediums;

a plurality of biasing magnetic means adapted to apply a biasing magnetic field to the portions of said magnetostrictive transmission mediums surrounded by said first and second coils;

a tabular display superposed on said tablet and having a display area substantially equal to the position detection area on said tablet;

a position appointing magnetism generator capable of producing a magnetism just enough for causing a local increase of electro-mechanical coupling coefficient in said magnetostrictive transmission mediums in said tablets;

a position detecting circuit adatped to supply a pulse current to one of said first and second coils so as to generate magnetostrictive vibration wave in a reference position on each magnetostrictive transmission medium or a position appointed by said position appointing magnetism generator, said position detecting circuit being further adapted to measure the time duration between the moment at which said magnetostrictive vibration wave is generated and a moment at which said magnetostrictive vibration wave has reached the appointed position or said reference position, thereby detecting the coordinate values of the position appointed by said position appointing magnetism generator;

a display control circuit adapted for driving said display in such a manner that the position corresponding to said coordinate values is displayed on said display; and a hard copy producing means for recording the date corresponding to said coordinate values.

* * * * *

UNITED STATES PATENT AND TRADEMARK OFFICE
CERTIFICATE OF CORRECTION

PATENT NO. : 4,697,244

DATED : September 29, 1987

INVENTOR(S) : Azuma Murakami, et al.

It is certified that error appears in the above-identified patent and that said Letters Patent is hereby corrected as shown below:

In the Abstract, line 20, change "pin" to --pen--.

Column 2, line 1, change "an" to --and--.

Column 5, line 68, change "orthogonally" to --orthogonal--.

Column 6, bridging lines 47-48, change "is applying" to --applies--.

Column 8, line 54, change "has" to --had--.

Column 11, line 6, delete "of".

Column 11, line 37, change "comprises" to --comprise--.

Column 12, line 6, change "medium" to --mediums--.

Column 12, line 8, change "arranges" to --arranged--.

Column 12, line 11, change "would" to --wound--.

Column 12, line 25, change "adatped" to --adapted--.

UNITED STATES PATENT AND TRADEMARK OFFICE
CERTIFICATE OF CORRECTION

PATENT NO. : 4,697,244

DATED : September 29, 1987

INVENTOR(S) : Azuma Murakami, et al

It is certified that error appears in the above-identified patent and that said Letters Patent is hereby corrected as shown below:

Column 12, line 43, change "date" to --data--.

Signed and Sealed this

Eighteenth Day of April, 1989

*Attest:*

DONALD J. QUIGG

*Attesting Officer*    Commissioner of Patents and Trademarks